United States Patent [19]
Tsybulevskiy et al.

[11] Patent Number: 6,096,194
[45] Date of Patent: Aug. 1, 2000

[54] SULFUR ADSORBENT FOR USE WITH OIL HYDROGENATION CATALYSTS

[75] Inventors: Albert M. Tsybulevskiy; Edward J. Rode, both of Louisville; Eric J. Weston, Shepherdsville; Kerry C. Weston, Louisville, all of Ky.

[73] Assignee: Zeochem, Louisville, Ky.

[21] Appl. No.: 09/453,736

[22] Filed: Dec. 2, 1999

[51] Int. Cl.$^7$ .................................................. C10G 29/00
[52] U.S. Cl. .................... 208/244; 208/208 R; 208/299; 502/60; 502/79
[58] Field of Search ................................ 208/208 R, 244, 208/299; 502/60, 79

[56] References Cited

U.S. PATENT DOCUMENTS

| | | |
|---|---|---|
| 4,179,361 | 12/1979 | Michlmayr . |
| 4,188,285 | 2/1980 | Michlmayr . |
| 4,204,947 | 5/1980 | Jacobson et al. . |
| 4,225,417 | 9/1980 | Nelson . |
| 4,446,005 | 5/1984 | Eberly, Jr. et al. . |
| 4,634,515 | 1/1987 | Bailey et al. . |
| 4,775,396 | 10/1988 | Rastelli et al. ............................... 55/58 |
| 4,978,439 | 12/1990 | Carnell et al. ............................. 208/91 |
| 5,057,473 | 10/1991 | Voecks et al. . |
| 5,070,052 | 12/1991 | Brownscombe et al. .................. 502/60 |
| 5,106,484 | 4/1992 | Nadler et al. . |
| 5,146,036 | 9/1992 | Hovis . |
| 5,146,039 | 9/1992 | Wildt et al. . |
| 5,159,128 | 10/1992 | Forschner et al. ....................... 585/653 |
| 5,322,615 | 6/1994 | Holtermann et al. . |
| 5,419,891 | 5/1995 | Coe et al. ............................... 423/700 |
| 5,807,475 | 9/1998 | Kulprathipanja et al. . |
| 5,843,300 | 12/1998 | Zinnen et al. . |
| 6,036,939 | 3/2000 | Funakoshi et al. ...................... 423/710 |

*Primary Examiner*—Tom Dunn
*Attorney, Agent, or Firm*—Scott R. Cox

[57] ABSTRACT

An adsorbent for organic sulfur compound removal from mineral, vegetable or animal oils useful to protect a hydrogenation catalyst against poisoning, wherein the adsorbent is a zinc-exchanged form of low silica faujasite with a silica to alumina ratio from about 1.8 to about 2.1, wherein the adsorbent contains an inequivalent excess of zinc cations from about 8 to about 20% (equiv.) and a process for manufacture and use of the adsorbent.

18 Claims, No Drawings

SULFUR ADSORBENT FOR USE WITH OIL HYDROGENATION CATALYSTS

FIELD OF INVENTION

The present invention relates to a novel adsorbent for sulfur compounds from mineral, vegetable or animal oils. It also relates to a novel adsorbent for sulfur compounds used in combination with oil hydrogenation catalysts. The invention also relates to a process for manufacture and use of the sulfur compound adsorbent.

BACKGROUND ART

Naturally occurring sulfur compounds, especially organic sulfur compounds, are commonly present in various oil products, such as vegetable, mineral and animal oils. These sulfur compounds include, for example, mercaptans, sulfides, polysulfides, sulfoxides, thiophenes and thiophanes. In order to stabilize and upgrade the properties of these oil products, most of them undergo a hydrogenation process to convert unsaturated hydrocarbons, alcohols, acids, fats to their respective saturated compounds. The hydrogenation process usually occurs over a Group VIII metal catalyst, particularly nickel, cobalt, platinum or palladium catalysts. These Group VIII catalysts are particularly sensitive to sulfur poisoning. Even when only trace levels of sulfur compounds in the range of 1 to 2 parts per million ("ppm") and lower are present in the oils, the hydrogenation catalysts can significantly decrease or completely lose their activity in a short period of time. Consequently, substantial efforts have been undertaken to eliminate or bind these sulfur contaminants to adsorbents prior to the oil hydrogenation process.

Various adsorption processes are well known for the removal of these sulfur compounds from catalytic process feed streams. In one conventional process, adsorption products are placed upstream to remove the sulfur compounds prior to interaction of the oils with the catalysts. Chemisorption of sulfur-containing compounds using metal or metal oxide adsorbents is the most popular method used for removal of these sulfur compounds from these oils. These metal oxides include nickel, platinum, cobalt, or copper in zerovalent form or zinc, manganese, cadmium, or copper oxides, either alone or secured to a support system.

For example, U.S. Pat. No. 4,634,515 discloses a sulfur trap adsorbent for sulfur-sensitive reforming catalyst protection, which comprises nickel on a support. At least 50% of the nickel is in a reduced, zerovalent state. The catalyst has a surface area of 30–50 $m^2/g$. U.S. Pat. No. 4,204,947 describes copper metal, copper oxide, or copper chromite secured on an inorganic, porous carrier as an adsorbent for the removal of mercaptans from hydrocarbon oils. This sulfur scavenger has a surface area in the range of 20–1000 $m^2/g$ and provides sulfur content reduction in a product from 2–3 ppm to 0.3 ppm range. U.S. Pat. No. 4,179,361 describes an adsorbent for mineral oil purification, which comprises cobalt oxide on a porous alumina. U.S. Pat. No. 4,225,417 discloses the use of manganese or manganese oxide on a support (clay, graphite, alumina, etc.) for sulfur scavenging and catalytic reforming catalyst protection.

All adsorbents mentioned above provide a high level of sulfur removal. These metal and metal oxide components bind organic sulfur compounds which results in metal sulfide formation. One disadvantage is that they must be used with expensive components in significant quantities. Further, they are nonregenerable or are very difficult to regenerate. This feature increases the operational expense for the catalytic process feed purification.

In an effort to decrease the adsorbent costs, the use of multistage purification with different adsorbent beds has been suggested. For example, U.S. Pat. No. 4,446,005 proposes a guard bed for reforming catalysts, which comprises two components: nickel metal on an activated alumina or alumosilicate and copper, zinc, or chromium oxides on a porous support. U.S. Pat. No. 5,322,615 discloses nickel or platinum on alumina as a first step adsorbent and potassium on alumina as a second step adsorbent. U.S. Pat. No. 5,106,484 teaches a three stage purification. A NaY synthetic zeolite is used at a temperature below 45° C. in the first step. Massive nickel or nickel on activated alumina maintained at a temperature of about 150° C. is used as the second step and the final third step employs a manganous oxide adsorbent operated at temperatures of 425–600° C. Although such multistage beds decreases the cost of the metal utilized, due to the entirely different temperature conditions at each stage, the process is quite complicated in the purification process technique and technology.

Several types of adsorbents for the intensive recovery of sulfur compounds have been formed which are based on synthetic zeolites, particularly in a transition metal-exchanged form. U.S. Pat. No. 4,188,285 discloses an adsorbent for thiophens for gasoline purification, which comprises a silver-exchanged form of an ultrastable faujasite Y. U.S. Pat. No. 5,057,473 discloses a desulfurization adsorbent, which comprises mono-(copper) or bication (copper-lanthanum) exchanged forms of a molecular sieve X. U.S. Pat. No. 5,146,036 describes the use a zeolite containing copper, silver, zinc, or mixtures thereof for the low-level recovery of sulfides or polysulfides. U.S. Pat. No. 5,807,475 teaches the use of nickel- or molybdenum-exchanged forms of zeolites X and Y for the removal of thiophens and mercaptans from gasoline. U.S. Pat. No. 5,843,300 discloses a regenerable adsorbent for organic sulfur compounds removal from petroleum feedstocks, which comprises a potassium form of a zeolite X loaded with 0.05–1% wt of palladium or platinum metal.

Although zeolite adsorbents provide a high level of sulfur recovery, their adsorption capacity is very low. For example, the adsorption capacity of the adsorbents, according to U.S. Pat. Nos. 5,146,039 and 5,807,475, does not exceed 0.1% w., even at relatively high concentrations of sulfides and thiophens. Further, the adsorption capacity of the adsorbent of U.S. Pat. No. 5,843,300, is only 0.6% w. for isobuthyl mercaptan and 0.3% for 2-methyl thiophene at an initial concentration of sulfur impurities of 3700 ppm (see Examples 1 and 2 of U.S. Pat. No. 5,843,300).

Application, Ser. No. 09/316,842, filed May 21, 1999, titled, "Molecular Sieve Adsorbent-Catalyst for Sulfur Compound Contaminated Gas and Liquid Streams and Process for Its Use" owned by the assignee discloses a high capacity adsorbent, which comprises synthetic faujasites, X, Y, or LSF in exchanged forms of bivalent cations of transition metals, preferably copper, zinc, cadmium, or manganese.

The main disadvantage of prior art adsorbents for oil hydrogenation catalyst protection, is their slow rate of adsorption of sulfur-contaminated compounds. The rate of organic sulfur compound chemisorption on transition metal oxides or molecular sieves is usually 20–50 times slower than the adsorption rate of the Group VIII metal catalysts for the sulfur compounds. Because of this deficiency, the adsorbents of the prior art do not protect the hydrogenation catalysts from sulfur poisoning "in situ" or in one bed. Thus, they are conventionally used in a preliminary feed treating stage, most commonly in a special adsorber. This complicates the hydrogenation process and substantially increases capital and operational costs.

While these products have been useful for hydrogenation catalyst protection against sulfur poisoning, it is important to create new adsorbents which overcome the disadvantages of the prior art adsorbents.

It is therefore an aspect of the invention to produce a novel adsorbent for organic sulfur compounds with improved efficiency in the protection of oil hydrogenation catalysts.

It is a further aspect of the invention to produce a zinc-exchanged form of a low silica faujasite (LSF) adsorbent in an which zinc cations are present in inequivalent excess.

It is a still further aspect of the invention to provide an adsorbent for sulfur compounds with an adsorption rate equal to or higher than the adsorption rate for sulfur compounds of conventional hydrogenation catalysts.

It is a still further aspect of the invention to provide an adsorbent for sulfur compounds with the capability to absorb very low quantities of sulfur compounds in oils down to a level of 1 ppm or lower.

It is a still further aspect of the invention to provide an adsorbent, which provides enhanced adsorption capacity for organic sulfur compounds at the elevated temperatures normally used for oil hydrogenation process.

It is a still further aspect of the invention to provide a relatively low cost adsorbent for use with a hydrogenation catalyst which does not substantially increase the cost of the overall oil hydrogenation process.

Still further objects and advantages will become apparent from consideration of the ensuing description of a preferred embodiment of the invention and examples therewith.

SUMMARY OF INVENTION

In accordance with the present invention, there is provided a sulfur compound adsorbent designed for use with oil hydrogenation catalysts, which adsorbent comprises a zinc ion exchange form of a low silica faujasite wherein at least 8 percent, and preferably from about 8 to about 20% (equiv.), of said zinc ions are present in inequivalent excess of the total ion exchange degree of the faujasite. Preferably the zinc ions comprise zinc or zinc oxide polycations with a general formula $[Zn\,O_\beta]^{2+}$, wherein varies from 2 to 8 and $\beta$ varies from 0 to 4.

The invention is also a process for the production of this adsorbent for oil hydrogenation catalyst protection.

The invention is also a process for the removal of sulfur containing compounds from a feed stream containing mineral, vegetable and animal oils comprising contacting the feed stream with an adsorbent product, where the adsorbent product comprises a zinc ion exchanged form of a low-silica faujasite having from about 8 to about 20% (equiv.) of said zinc ions in an inequivalent excess of the total ion exchange degree of the faujasite.

DETAILED DESCRIPTION OF THE INVENTION

The adsorbent product of the present invention is a zinc exchanged form of a low silica faujasite with an inequivalent excess of zinc or zinc ions present on, or associated with, the faujasite crystal. These adsorbents can be utilized with catalysts, especially hydrogenation catalysts, to protect them from sulfur poisoning, or to at least delay the sulfur poisoning of the catalyst, during the hydrogenation process. These adsorbents have the capability of adsorbing sulfur compounds at least as well as the catalyst with which they are used, and preferably better.

The preferred form of zeolite is a low silica zeolite X. Substitution of the sodium cations present in a conventional synthetic faujasite structure with zinc ions results in an increase in the adsorption capacity for sulfur containing compounds of the synthetic faujasite. It has also been discovered that this zinc exchanged form of the synthetic faujasite displays enhanced adsorption capacity for sulfur-containing compounds, even at low concentration levels for the sulfur-containing compounds, i.e. below 1 ppm. It has also been discovered that this zinc exchanged form of a low silica faujasite adsorbs the sulfur compounds at least as quickly as do conventional oil hydrogenation catalysts. This high capacity and rapid adsorption of sulfur-containing compounds results in an enhanced level of sulfur purification of oil feed streams.

An acceptable range for ion exchange of zinc ions in the faujasite structure is from about 20 to about 80% (equiv.), preferably about 60 to about 80% (equiv.). However, for the adsorbent to be effective, it has been surprisingly discovered that there must be an inequivalent excess of zinc or zinc containing cations (sometimes referred to generally as "zinc ions") present in the faujasite X structure. Preferably the excess is greater than about 8% and more preferably from about 8 to 20% of the available ion exchange degree of the faujasite X structure. In fact, it has been surprisingly discovered that the overall percentage of zinc ions that are exchanged is not particularly critical, as long as there is an adequate inequivalent excess of the zinc ions present.

The general formula of the zinc exchanged, low-silica faujasite in one preferred embodiment is thought to be as follows:

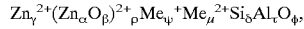

wherein $(Zn_\alpha O_\beta)^{2+}$ are polycations with the number of zinc atoms $\alpha$ from 2 to 8 and the number of oxygen atoms $\beta$ from 0 to 4; $\delta/\tau$, silicon/aluminum ratio varies from about 0.9 to about 1.05, $Me^+$ and $Me^{2+}$ are cations of alkali and alkaline-earth metals, and $\psi$ and $\mu$ represents the alkali and alkaline-earth metals ion exchange degrees, respectively, which varies from about 0.2 to about 0.8; wherein said zinc-exchanged low-silica faujasite contains an inequivalent excess of zinc so that the ratio of the sum of all cation equivalents to the aluminum equivalent content:

$$Y=(\gamma+\cdot\rho+\psi+\mu)/\tau$$

is above 1.08; and wherein said zinc polycations content $\rho$ corresponds to the ratio, $\rho=(Y-1)/\alpha$.

While not being bound to a particular methodology, it is believed that the zinc ions present in excess are in the form of cluster zinc or zinc oxide polycations of a general formula $[Zn\,O_\beta]^{2+}$ wherein varies from about 2 to about 8 and $\beta$ varies from about 0 to about 4. These cluster polycations are usually formed in a presence of partially hydrolyzed or reduced cations. For example, $[Zn\,O_\beta^{2+}]$ clusters are produced from the following reactions:

or

$$Zn(OH)^+ + Zn^{2+} \rightarrow [Zn_2O]^{2+} + H^+ \quad (2)$$

Alternatively, polycations of $Zn_2^{2+}$ type may be formed by the condensation reaction of mononuclear zinc ions with zero valent zinc atoms as follows:

$$Zn_2^{2+} + Zn^0 \rightarrow Zn_2^{2+} \quad (3)$$

The simultaneous occurrence of reactions (1)–(3) and the consecutive evolution of the reactions (2) or (3) leads to the formation of cluster polycations of the general formulae $Zn_\alpha O_\beta$, where $\alpha$ varies from 2 to 8 and $\beta$ varies from 0 to 4. In turn, it is believed that polycations' formation causes a significant excess of zinc equivalents content in zeolite relative to mononuclear zinc ion species. For example, complete substitution of mononuclear ions $Zn^{2+}$ by polycations $Zn_2^{2+}$ or $[Zn_2O]^{2+}$ enhances the ion exchange.

It is known that zeolite intracrystalline cages can be used for alkali and transition metal polycations stabilization. Direct evidence of zinc and zinc oxide polycation formation in the respective ion-exchanged forms of zeolites A, X, and Y is presented, for example, in the following publications:

1) "Structural investigation of zinc oxide clustering in zeolite A and sodalite" by L. Khouchaf et al., Microporous and Macroporous Materials, vol. 20, 1998, pp. 27–37;
2) "Zeolites as matrices for the stabilization of unusual cationic zinc species" by F. Rittner et al., Microporous and Macroporous Materials, vol. 24, 1998, pp. 127–131;
3) "Zinc oxide nano-cluster formation in zeolite" by Hoo Bum Lee et al., Bulletin of Korean Chemical Society, vol. 19, 1998, pp. 1002–1005.

It has also been discovered that the conditions of partial hydrolysis of zinc cations are favorable for zinc oxide cluster formation. Due to the small size of zeolite A intracrystalline cages, substantial quantities of the zinc polycations that are necessary to form an effective adsorbent cannot be present on the crystals, thus making adsorbents formed from such zeolite A less useful than those of the present invention. In addition, standard zeolite X with silica:alumina ratios greater than about 2.3:1 and standard zeolite Y with a silica:alumina ratio greater than about 3.5 possess less exchangeable cations than the low silica faujasite zeolite X of the present invention, making them also not as useful for the adsorbent of the invention.

Generally adsorbents according to the invention are formed using a conventional ion exchange procedure, whereby sodium/potassium forms of a low silica faujasite powder or granule are ion exchanged with zinc salt/water solutions, for instance, chlorides, nitrates, acetates, etc. It has been surprisingly discovered that two different methodologies of ion exchange are preferably used to form the zinc exchanged faujasites of the present invention. A significant inequivalent excess of zinc ions can be formed by means of ion exchange using very dilute 0.01–0.1 N zinc salt solutions with the solution maintained at a pH of about 5.8 to 6.5. An alternative method consists of the use of concentrated 1 to 4 N zinc salt solutions for ion exchange with a controlled pH in the range of 5.6 to 6.2 over the full exchange procedure. Any other process that results in an inequivalent excess of zinc ions is also within the scope of this invention.

The balance of the ions in the faujasite structure are preferably alkali and/or alkaline earth metals. In the preferred embodiments when the zinc ions comprise from about 20 to about 80%, the balance of the ions in the adsorbent comprise alkali and alkaline earth metals. Preferably the alkali and/or alkaline earth metals are selected from sodium, potassium, calcium, and magnesium. The total ions will exceed 100% because some of the zinc ions are present in an inequivalent excess on the faujasite crystal.

After the zinc ion exchanged product is formed, it is washed to remove substantially the chloride ions to a level of less than about 200 ppm. The product is then dried at a temperature from about 100 to 120° C. To form shaped adsorbent articles, the product can be blended with conventional binders, including mineral or synthetic binders, such as clays, silicas, aluminas, aluminosilicates, etc. The adsorbent of the invention can be used in powder form or it can be formed as spheres, beads, cylinders, extrudates, pellets, granules, rings, multileaves, honeycomb or in monolith structures. To form these products a mixture can be kneaded to form a paste and granulated. The granulated product in the form of extrudates, beads, tablets, etc. is dried and calcined at a temperature of about 250 to about 550° C.

A zinc-exchanged, low silica faujasite produced by the above-described process is particularly useful for the purification of oil streams from sulfur compounds prior to hydrogenation of the oil stream. The preferred type of oil streams which can be purified by the adsorbents according to the present invention include mineral, vegetable and animal oils. In one preferred use, the adsorbent is particularly useful for the purification of edible oils.

While the zinc-exchanged, low silica faujasite produced by the above-described process can be used as a sulfur trap or in a bed at a location preceding the hydrogenation catalyst bed, it has been discovered that the novel adsorbent of the invention can protect the hydrogenation catalysts in situ or in the same bed during the hydrogenation process. Conventional adsorbents have not been able to be used in situ because the catalysts generally adsorb the sulfur compounds at a rate faster than the conventional adsorbent. A standard hydrogenation catalyst, such as a nickel on kieselguhr catalyst, can be blended with the adsorbent of the invention, either by itself or with some form of stabilization material that blends easily with the material being hydrogenated.

It has been surprisingly discovered that the novel adsorbent of the invention can protect conventional hydrogenation catalysts in situ, and can increase their activity by 15 to 40%. This increase improves the quality of the final hydrogenation product, decreases processing time, and may decrease the quantity of hydrogenation catalyst that must be used to produce the same quantity of end product.

The quantity of the adsorbent utilized with the hydrogenation catalyst can vary. Preferably it ranges from a ratio of adsorbent:hydrogenation catalyst from about 1:20 to about 3:10, although higher ratios are also acceptable.

The zinc exchanged low silica faujasite of the above described invention are especially useful for the removal of organic sulfur compounds from animal, vegetable and mineral oils at the high temperatures used by hydrogenation ranging from about 130 to about 350° C. In these feed streams the absorbent of the invention provides significant reduction in the amount of sulfur compounds in the feed stream down to a level of 1 ppm or less, if sufficient adsorbent is utilized.

In order to illustrate the present invention and the advantages thereof, the following examples are provided. It is understood that these examples are illustrative and do not provide any limitation on the invention. In particular, it is important to understand that the present invention is generally applicable for the removal of a broad range of sulfur compounds from various feed stocks, particularly mineral, vegetable and animal oils.

EXAMPLE 1

According to the Invention 200 g of a sodium-potassium low silica faujasite (LSF) powder acquired from Zeochem with a silica/alumina ratio of 2.04 were treated at room temperature with 40 L of a 0.1N solution of zinc chloride over 4 hours in a beaker under constant agitation. The pH of the zinc chloride solution was maintained within the range of 5.9–6.2 during the ion exchange procedure. The product produced from this ion exchange was filtered and then washed on the filter with deionized water to remove chloride ions up to a negative reaction with 0.028 N silver nitrate solution. The zinc-exchanged LSF paste formed was dried overnight at 110° C. and dehydrated at 250° C. for 2 hours. The analysis of the zinc-exchanged final product, conducted by Inductively Coupled Plasma Optical Emission Spectroscopy (ICP), showed the following cation composition:

Zn–72.4%; Na–30.1%; K–14.2% (equiv.).

This analysis means that there was a zinc ion exchange excess in the resulting product in the range of:

Zn–[100–(Na+K)]=16.7%

EXAMPLE 2

Comparative 50 g of a standard 13X molecular sieve powder Z10-02 from Zeochem having a silica/alumina ratio of 2.35 were treated with 10 L of 0.1 N zinc chloride solution in the manner described in Example 1. The operating procedure of Example 1 for the washing, drying, and dehydrating was also repeated. The cation composition of the resulting product, according to ICP analysis was: Zn–75.1; Na–24.9% (equiv.). Thus, there was no excess of zinc ions present.

EXAMPLES 3 TO 6

Preparation of the Adsorbent Samples with Various Excess Levels of Zinc Ions 200 g a sodium-potassium low silica faujasite powder from Zeochem with a silica/alumina ratio of 2.01 was treated with 2 L of a 1N water solution of zinc chloride (Examples 3, 4, and 5) or zinc acetate (Example 6). To keep the pH of the solution over the full ion exchange between 6.2 in Example 4, and 7.4, in Example 5 respectively, 50 ml of a buffer solutions were added. The buffer solutions were:

Example 4—0.1 M sodium acetate solution;

Example 5—0.03 M dibasic potassium phosphate and 0.0096 M monobasic potassium phospate.

No buffer solution was used in Examples 3 and 6. The pH value of the solution during the course of the ion exchange run varied in the range of 4.95–5.85 in the case of zinc chloride of Example 3 and in the range of 6.3–6.5 in the case of zinc acetate of Example 6. The remaining conditions of the ion exchange were the same as in Example 1, and the operating procedure of Example 1 for the powder washing, drying, and dehydrating was repeated. The cation composition of the resulting products was:

Example 3: Zn–58.4%; Na–29.5%; K–11.9% (equiv.); Zinc ion excess is 0.

Example 4: Zn–71.7%; Na–26.0%; K–11.2% (equiv.); Zinc ion excess is 8.9% (equiv.)

Example 5: Zn–70.1%; Na–21.2%; K–8.2% (equiv.); Zinc ion excess is 1.5% (equiv.)

Example 6: Zn–66.0%; Na–26.7%; K–9.6% (equiv.); Zinc ion excess is 2.3% (equiv.)

Therefore, among the adsorbents of Examples 1 to 6, at practically the same level of total ion exchange, about 70% (equiv.), only the adsorbents of Example 1 and 4 contained adequate excess zinc ions and, thus, constitute the adsorbents according to the invention.

EXAMPLE 7

Adsorption Test

The adsorbents prepared in Examples 1 through 6 were tested for methyl oleate purification. Methyl oleate, 99% purity, from ALDRICH Chemical, Inc., was spiked with 20 ppm of butyl mercaptan. The oil purification was measured employing the following procedure:

About 0.4 g of the adsorbent was placed into a glass container with 100 ml of the spiked oil. The adsorbent-oil mixture was maintained at 130° C. temperature for 2–6 hours under continuous agitation until the concentration of mercaptan in the oil reached a constant value. The oil samples for analyses were removed through a septum of the container every hour. Analyses of the oil samples before and during the course of the adsorption were carried out by means of Varian 3800 gas chromatograph with a pulse flame photometric detector (PFPD) and 6.0 m megabore column with DB-1 stationary liquid phase. The gas-carrier was helium at 5 cm/sec. The column oven was isothermal at 180° C. The adsorption capacity of the samples are shown in Table 1.

TABLE 1

| Adsorbent | Zinc excess, % (eqiv.) | Butyl Mercaptan Final Concentration ppm | Adsorption Capacity, %, w. |
|---|---|---|---|
| Example 1 | 16.7 | 2.5 | 0.34 |
| Example 2 | 0.0 | 12.0 | 0.12 |
| Example 3 | 0.0 | 15.0 | 0.06 |
| Example 4 | 8.9 | 0.82 | 0.37 |
| Example 5 | 1.5 | 8.0 | 0.20 |
| Example 6 | 2.3 | 13.0 | 0.10 |

The adsorbents according to the present invention (Examples 1 and 4), demonstrated outstanding performance in oil purification. Only the adsorbents according to the invention produced deep level of mercaptan adsorption, showing 1.5–4 times higher adsorption capacity than the other adsorbents at practically the same level of ion exchange. The adsorbent of Example 2, which was prepared using the standard molecular sieve 13X in the same manner as the adsorbent of Example 1, did not contain a zinc excess and resulted in poor performance of methyl oleate purification.

EXAMPLE 8

Catalytic Activity Test

The adsorbents of Example 1 to 4, combined in a slurried blend with standard G-135A nickel/kieselguhr catalyst obtained from United Catalysts, Inc. were tested for catalytic activity in an oil hydrogenation process employing a 2 L Parr Stirred Autoclave. The standard zinc/alumina chemisorbent C7-6 from United Catalysts, Inc. was also tested as a reference. For the purpose of comparison some tests were carried out without any additives, with the United Catalysts, Inc. catalyst alone.

Menhaden fish oil with a sulfur content of 9 ppm of sulfur with 9 ppm of added sulfur in the form of butyl sulfide added to the oil was used as the feedstock in these tests. The following procedure was followed to test the catalyst-adsorbent blend. 15 g of the adsorbent sample was incorporated in a soybean stearine stabilization media and then suspended with 50 g of the standard G-135A United Catalysts, Inc. catalyst. The catalyst-adsorbent blend was placed into an autoclave for the oil hydrogenation reaction test. Reaction conditions were: temperature—180° C.; hydrogen pressure—2.7 bar; agitation rate—1000 rpm. The test runs were carried out to the point where the iodine value of hydrogenated oil reached 70 to 80 IV units. The test results are disclosed in Table 2.

TABLE 2

| | Activity, min | |
|---|---|---|
| Adsorbent | Menhaden Oil Iodine value - 80 IV units. | Menhaden Oil + 9 ppm of sulfur as butyl sulfide Iodine Value - 70 IV units |
| Example 1 | 33.5 | N/A |
| Example 2 | N/A | 65 |
| Example 3 | 53 | 100 |
| Example 4 | 37 | 46.5 |
| ZnO | N/A | >60 |
| None | 47 | 56 |

The adsorbents, according to the present invention, demonstrated an exceptional efficiency in protecting the oil hydrogenation catalyst. As can be seen from Table 2, the adsorbents of Examples 1 and 4 performed 15–28% better than the conventional products by decreasing the time that is required for reaching a predetermined hydrogenated oil Iodine Value in comparison with the standard nickel/kieselguhr catalyst performance. At the same time, the prior art adsorbent, such as zinc oxide did not protect the nickel catalyst from poisoning and essentially deteriorated the catalyst performance.

Therefore, the adsorbents, according to the present invention, provided better protection for hydrogenation catalyst in situ than was achieved by conventional adsorbents of the prior art. This ability of the adsorbent to bind sulfur-contaminated compounds more rapidly than hydrogenation catalysts significantly decreases the capital investments in oil processing by eliminating the expense of preliminary oil purification. Furthermore, the zinc exchanged low silica faujasites of the present invention form an adsorbent with several other advantages over prior art adsorbents:

(1) a high dispersity of active components and a high rate of organic sulfur compounds adsorption;

(2) an ability to protect oil hydrogenation catalysts in situ or in a single bed or in a sulfur trap prior to the hydrogenation catalyst bed;

(3) a considerable adsorption capacity at the elevated temperatures common with an oil hydrogenation process (150–250° C.);

(4) a high adsorbing capability for organic sulfur compounds present in oils including mercaptans, sulfides, thiophenes, sulfoxides, etc.

(5) an ability to substantially improve hydrogenation catalyst performance and thereby significantly reduce the catalyst cost due to excluding expensive promoting additives from the catalyst composition resulting in an increased catalyst sulfur resistance.

Thus, it is apparent that the adsorbent of the present invention provides highly reliable protection for oil hydrogenation catalysts that can be used commercially with a great efficiency.

While the above description contains many specifics, these should not be construed as limitations on the scope of the invention, but rather as an exemplification of one preferred embodiment thereof. Many other variations are possible.

We claim:

1. An adsorbent for sulfur contaminated compounds comprising a zinc ion exchanged form of a low silica faujasite with a silica to alumina ratio from about 1.8:1 to about 2.1:1, wherein the zinc ions are present in the faujasite in an inequivalent excess of a total cation exchange degree.

2. The adsorbent of claim 1 wherein a ratio of a sum of all cation equivalents to an aluminum equivalent number of the zinc exchanged low silica faujasite is at least about 1.08.

3. The adsorbent of claim 1 wherein a ratio of all cation equivalents to an aluminum equivalent number of the zinc exchanged low silica faujasite is from about 1.08 to about 1.20.

4. The adsorbent of claim 1 further comprising alkali and alkaline earth cations.

5. The adsorbent of claim 4 wherein the alkali and alkaline earth ions are selected from the group consisting of sodium, potassium, calcium and magnesium.

6. The adsorbent of claim 1 wherein the zinc ions comprise cluster zinc or zinc oxide polycations of a general formula $Zn_\alpha O_\beta^{2+}$, wherein varies from 2 to 8 and $\beta$ varies from 0 to 4.

7. An adsorbent for sulfur-contaminated compounds comprising a zinc ion exchange form of a low silica faujasite, wherein the low silica faujasite has a general formula of $Zn_\gamma^{2+}(Zn_\alpha O_\beta)^{2+}_\rho Me_\psi^+ Me_\mu^{2+} Si_\delta Al_\tau O_\phi$, wherein $(Zn_\alpha O_\beta)^{2+}$ comprise polycations with the number of zinc atoms $\alpha$ is from about 2 to about 8 and the number of oxygen atoms is from 0 to about 4, wherein $\delta/\tau$, the silicon/aluminum ratio, varies from about 0.9 to about 1.05, wherein $Me^+$ and $Me^{2+}$ comprise cations of alkali and alkaline-earth metals, wherein the alkali and alkaline-earth metals ion exchange degrees, $\psi$ and $\mu$, vary from about 0.2 to about 0.8;

wherein said zinc-exchanged low-silica faujasite contains an inequivalent excess of zinc so that a ratio of the sum of all cation equivalents to the aluminum equivalents content:

$$Y=(\gamma+ \cdot\rho+\psi+\mu)/\tau$$

is above about 1.08; and wherein said zinc polycations content $\rho$ corresponds to the ratio, $\rho=(Y-1)/\alpha$.

8. The adsorbent of claim 7 wherein the ratio of the sum of all cation equivalents of the faujasite to an aluminum equivalent content of the faujasite is between about 1.08 and 1.2.

9. An adsorbent for sulfur-contaminated compounds to protect oil hydrogenation catalysts comprising a low-silica faujasite having a silica:alumina ratio from about 1.8 to about 2.1, wherein said low-silica faujasite comprises zinc mononuclear and zinc polycations having a general formulae of $[Zn_\alpha O_\beta]^{2+}$ where $\alpha$ varies from about 2 to about 8 and $\beta$ varies from 0 to about 4 and wherein a zinc polycation content in said low-silica faujasite is in excess of about 8 percent of equivalent.

10. A process for purifying a sulfur contaminated liquid feed stream which comprises contacting the sulfur compound contaminated liquid feed stream with the adsorbent of claim 1.

11. The process of claim 10 wherein the liquid feed stream comprises from about 1 ppm to about 500 ppm of sulfur compounds.

12. The process of claim 10 further comprising maintaining the temperature of the liquid feed stream at a temperature from about 150 to about 350° C.

13. A process for the production of an adsorbent for sulfur contaminated compounds comprising obtaining a low silica faujasite with a silica/alumina ratio from about 1.8 to about 2.1;

ion exchanging the low silica faujasite with a zinc compound such that at least about 8% of the zinc cations are in an inequivalent excess of the total ion exchange capacity of the low silica faujasite; and forming the low silica faujasite into an adsorbent product.

14. The process of claim 13 further comprising washing the ion exchanged low silica faujasite to remove substantially the chloride ions to a level less than about 200 ppm.

15. The process of claim 14 further comprising drying the ion exchanged low silica faujasite at a temperature from about 100 to about 120° C.

16. The process of claim 15 further comprising blending the ion exchanged low silica faujasite with a conventional binder, selected from the group consisting of clays, silicas, aluminas and aluminosilicates.

17. The process of claim 16 further comprising granulating the ion exchanged low silica faujasite blend into shaped articles, selected from the group consisting of spheres, beads, cylinders, extrudates, pellets, granules, rings, multileaves, honeycombs, and monolith structures.

18. The process of claim 17 further comprising calcining the shaped articles at a temperature from about 250 to about 550° C.

\* \* \* \* \*